United States Patent
Klose

(10) Patent No.: US 6,911,128 B2
(45) Date of Patent: Jun. 28, 2005

(54) DEVICE FOR DECONTAMINATION OF WATER

(75) Inventor: Giselher Klose, Auerbach (DE)

(73) Assignee: ARS USA LLC, Placitas, NM (US)

( * ) Notice: Subject to any disclaimer, the term of this patent is extended or adjusted under 35 U.S.C. 154(b) by 177 days.

(21) Appl. No.: 10/243,561

(22) Filed: Sep. 12, 2002

(65) Prior Publication Data

US 2003/0183516 A1 Oct. 2, 2003

Related U.S. Application Data

(60) Provisional application No. 60/368,026, filed on Mar. 27, 2002.

(51) Int. Cl.$^7$ .............................. C25C 7/00; C25C 7/04; C02F 1/463; C02F 1/465
(52) U.S. Cl. .............................. 204/297.06; 204/278.5; 204/286.1; 204/242
(58) Field of Search .................. 204/297.06, 278.5, 204/286.1, 242

(56) References Cited

U.S. PATENT DOCUMENTS

| | | | | |
|---|---|---|---|---|
| 746,748 A | * | 12/1903 | Schwarz | 204/238 |
| 1,348,000 A | * | 7/1920 | Fleming | 204/242 |
| 1,387,425 A | * | 8/1921 | Merritt | 205/128 |
| 3,090,823 A | * | 5/1963 | Roach | 204/229.6 |
| 3,984,255 A | * | 10/1976 | Tiegel | 205/57 |
| 3,997,421 A | * | 12/1976 | Perri et al. | 204/267 |
| 4,399,020 A | * | 8/1983 | Branchick et al. | 204/269 |

FOREIGN PATENT DOCUMENTS

EP 754166 A1 * 1/1997 .......... C02F/1/465

* cited by examiner

Primary Examiner—Roy King
Assistant Examiner—Harry D. Wilkins, III
(74) Attorney, Agent, or Firm—V. Gerald Grafe

(57) ABSTRACT

The invention relates to a device for the decontamination of water, particularly of heavy metals and/or arsenic and/or their compounds, by means of electrolysis, wherein the water to be purified is fed through a receptacle and passes by electrodes of different polarities. According to the invention, a combination of electrodes made from iron, aluminium, and graphite, or from aluminium and graphite, is used. Facing the direction of the receptacle bottom, the undersides of the electrodes are contained in groove-like, electrically insulated recesses that are spaced apart and separated from one another on their opposite side by single electrically insulating spacers, wherein the spacers are attached to the electrodes, and the electrodes, which can be unfolded, are arranged in the groove-like recesses (FIG. 5).

22 Claims, 3 Drawing Sheets

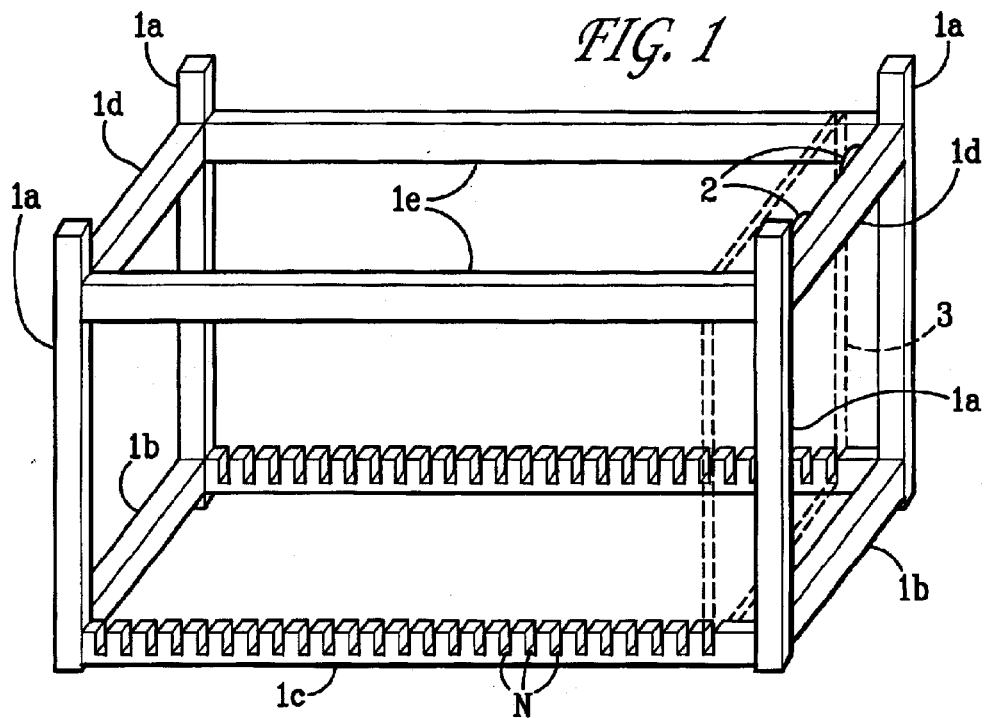
FIG. 1
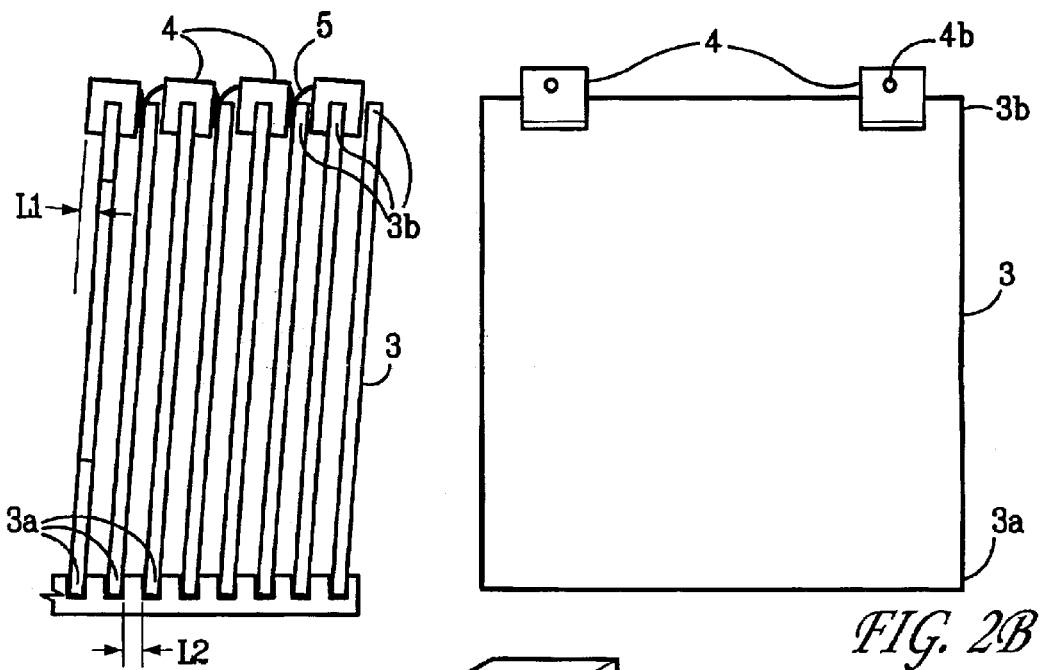
FIG. 2
FIG. 2B
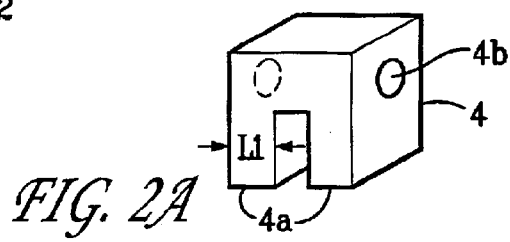
FIG. 2A

DEVICE FOR DECONTAMINATION OF WATER

CROSSREFERENCE TO RELATED APPLICATIONS

This application claims the benefit of U.S. provisional application No. 60/368,026, filed Mar. 27, 2002, incorporated herein by reference.

BACKGROUND

The invention relates to a device for the decontamination of water, particularly removal of heavy metals and/or arsenic and/or their compounds.

The elimination of particularly heavy metals and/or arsenic and/or their compounds from water in order to produce drinking water is currently possible only in an unsatisfactory manner. The contamination levels of drinking water with, for example, arsenic—especially in regions with similarly polluted groundwater—generally lie at or above the permitted values. Numerous devices for purifying water are already known; however, they are not effective in removing arsenic DE 33 36 460 A1, for example, describes a method and a device for purifying water by means of electrolysis, wherein the water to be purified is conducted past electrodes made of bivalent or trivalent metals of different polarities. Iron or aluminium is preferably used as the electrode material.

Furthermore, an arrangement for treating polluted water by means of electrolysis is known, in which alternating electrodes made from steel and aluminium are combined with one another (DE 43 15 117 A1), or iron and/or aluminium electrodes are used (DE 43 29 272). The use of aluminium electrodes, however, results in a high pH-value, which has an especially negative effect on the removal of arsenic.

More advantageous in this regard is the pH-value in the solutions disclosed in DE 694 16 698 T2, WO 99/11577 A1, DE-OS 2 201 070, and JP 7-256272 A, which use carbon dioxide. The $CO_2$ is produced by using graphite electrodes or added from the outside during electrolysis. Admittedly, however, the combination of electrodes used for attaining a low pH-value, and thereby a high reduction of arsenic, is not optimal. Extremely disadvantageous in all of the devices of the prior art is the fixed, immovable arrangement of the electrodes. This causes their handling, especially during the repair and cleaning of the device, to be more difficult.

Accordingly, there is a need for improvements to water-treating apparatus that accommodate easier cleaning and repair, and maintain efficient contaminant removal.

SUMMARY OF THE INVENTION

The present invention provides a device for the decontamination of water, particularly of heavy metals and/or arsenic and/or their compounds, by means of electrolysis. The present invention facilitates an efficient reduction of arsenic without polluting the environment and enables quick and relatively easy maintenance of the electrodes.

A device according to the present invention can comprise a receptacle in which electrodes of different polarities can be arranged. The electrodes can be made from, for example, iron, aluminium, and graphite, or aluminium and graphite.

Facing the direction of the receptacle bottom, the undersides of the electrodes can be contained in electrically insulated mounts, spaced apart and separated from one another. The electrodes on the side opposite the receptacle bottom can be spaced apart and separated from each other by electrically insulating spacers, wherein the spacers can be attached to the electrodes. The electrodes can be mounted with the spacers such that a plurality of electrodes fold and unfold. The electrically insulating mounts can comprise groove-like recesses.

The electrodes can be contained in a frame that has groove-like recesses in the direction of the receptacle bottom. The electrodes can be mounted in the recesses in the frame, and the frame situated in the receptacle. The electrodes can be tilted at an angle to vertical, and can fit against a stopper of the frame.

The spacers can be attached to the electrodes in a detachable manner. For example, they can comprise clamps or as burls.

The spacers can be connected to each other by means of a cable or a chain. Furthermore, they can have projections that lock into corresponding recesses in the electrodes.

One or more frames with plate-like electrodes can be arranged in one receptacle, depending upon its size. They can be aligned in the direction of flow or inclined at a specified angle to the direction of flow.

The ratio of the number of aluminum electrodes: iron electrodes : graphite electrodes can be 60-96 : 2-30: 2-30. The ratio of aluminium electrodes : graphite electrodes can be 60-98:2-40.

By using a solution according to the invention, a relatively simple structural device for the decontamination of water, particularly of heavy metals and/or arsenic and/or their compounds, can be achieved. By using graphite electrodes and particularly by realizing a certain ratio of the utilized electrodes, it is thereby possible to bring the pH-value of the water to be purified to a level that aids in the deoxidation of the toxic materials. The number of the different electrodes (iron, aluminium, graphite) can be determined by suitable tests. In certain cases, it is also possible to refrain from using electrodes made from iron.

Attaching the electrodes by means of groove-like formations on the underside of the bottom and single spacers on the top side of the electrodes makes it possible for these to be individually unfolded and moved against one another.

Plate-like electrodes can be simply placed into the recesses of the frame and separated from one another on the opposite side by spacers. The spacers can be designed, for example, like clamps (U-shaped) and simply placed over the upper edge of the electrode. Two spacers (right and left) can be attached onto one plate It is also possible to provide the spacer only alternate plates.

The first plate that is inserted can be arranged in a slightly slanted position on a stopper of the frame, which renders a complicated fixation of the positioning unnecessary.

The present invention provides an apparatus characterized by easy handling and assembly, as well as an uncomplicated maintenance.

DESCRIPTION OF THE FIGURES

The invention is explained by using embodiment examples and corresponding drawings, which are incorporated into and form part of the specification.

FIG. 1: Frame for inserting the electrodes;

FIG. 2: Side view of the electrodes with spacers;

FIG. 2a: Clamps

FIG. 2b Side view of electrodes according to FIG. 2;

DETAILED DESCRIPTION

Figure 3:
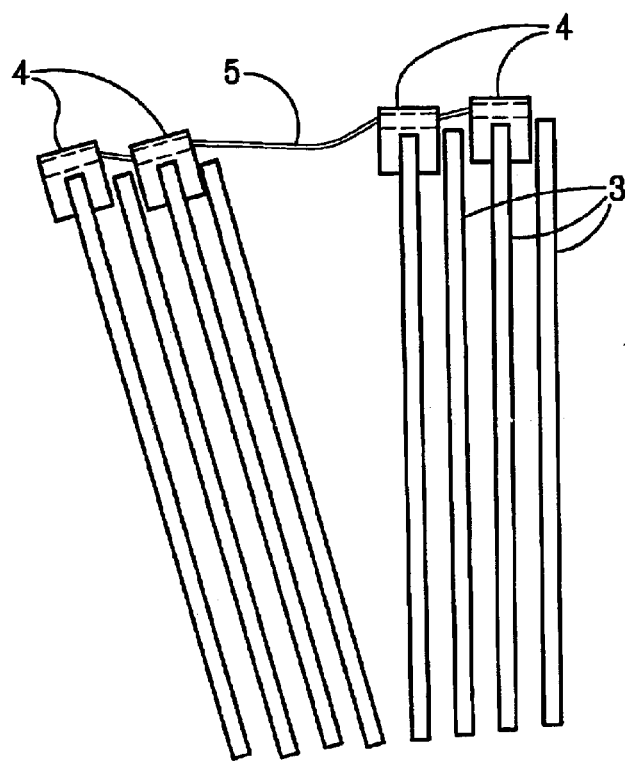
FIG. 3: Unfolded electrodes.

The present invention provides a device for the decontamination of water, particularly of heavy metals and/or arsenic and/or their compounds, by means of electrolysis. The present invention facilitates an efficient reduction of arsenic without polluting the environment and enables quick and relatively easy maintenance of the electrodes.

A device according to the present invention can comprise a receptacle in which electrodes of different polarities can be arranged. The electrodes can be made from, for example, iron, aluminium, and graphite, or aluminium and graphite.

Facing the direction of the receptacle bottom, the undersides of the electrodes can be contained in electrically insulated mounts, spaced apart and separated from one another. The electrodes on the side opposite the receptacle bottom can be spaced apart and separated from each other by electrically insulating spacers, wherein the spacers can be attached to the electrodes. The electrodes can be mounted with the spacers such that a plurality of electrodes fold and unfold The electrically insulating mounts can comprise groove-like recesses, or any other structure that discourages the undersides of adjacent electrodes from coming into contact with each other.

The electrodes can be contained in a frame that has groove-like recesses in the direction of the receptacle bottom. The electrodes can be mounted in the recesses in the frame, and the frame situated in the receptacle The electrodes can be tilted at an angle to vertical, and can fit against a stopper of the frame.

The spacers can be attached to the electrodes in a detachable manner. For example, they can comprise clamps or as burls.

The spacers can be connected to each other by means of a cable or a chain. Furthermore, they can have projections that lock into corresponding recesses in the electrodes.

One or more frames with plate-like electrodes can be arranged in one receptacle, depending upon its size. They can be aligned in the direction of flow or inclined at a specified angle to the direction of flow.

The ratio of the number of aluminum electrodes:iron electrodes:graphite electrodes can be 60-96:2-30:2-30. The ratio of aluminium electrodes: graphite electrodes can be 60-98:2-40.

By using a solution according to the invention, a relatively simple structural device for the decontamination of water, particularly of heavy metals and/or arsenic and/or their compounds, can be achieved. By using graphite electrodes and particularly by realizing a certain ratio of the utilized electrodes, it is thereby possible to bring the pH-value of the water to be purified to a level that aids in the deoxidation of the toxic materials. The number of the different electrodes (iron, aluminium, graphite) can be determined by suitable tests. In certain cases, it is also possible to refrain from using electrodes made from iron.

Attaching the electrodes by means of groove-like formations on the underside of the bottom and single spacers on the top side of the electrodes makes it possible for these to be individually unfolded and moved against one another.

Plate-like electrodes can be simply placed into the recesses of the frame and separated from one another on the opposite side by spacers. The spacers can be designed, for example, like clamps (U-shaped) and simply placed over the upper edge of the electrode. Two spacers (right and left) can be attached onto one plate. It is also possible to provide the spacer only alternate plates.

The first plate that is inserted can be arranged in a slightly slanted position on a stopper of the frame, which renders a complicated fixation of the positioning unnecessary.

The present invention provides an apparatus characterized by easy handling and assembly, as well as an uncomplicated maintenance.

A frame 1 with four vertical struts 1.1 is shown in FIG. 1. In the direction of the bottom, arranged between first vertical struts 1.1 are two shorter horizontal second struts 1.2 and two longer horizontal third struts 1.3. The longer horizontal third struts 1.3 contain groove-like recesses N, so that these struts 1.3 have a comb-like design. Above the horizontal second struts, horizontal fourth struts 1.4 are arranged opposite each other, aligned at the upper end of the first struts 1.1. Running at a right angle to this are two additional horizontal fifth struts 1.5. Two stoppers 2 are provided on the fourth strut that is shown here on the right. The dotted line indicates a plate-like electrode 3 in the groove N. The electrode 3 hereby lies at angle a to the stoppers 2. It is nevertheless also possible for a fourth strut 1.4 of the frame 1 to serve as stopper 2 for the first electrode 3.

Furthermore, in the bottom area, several struts parallel to each other 1.3. can be arranged with grooves N that are aligned to each other, in order to ensure a more stable positioning of the electrodes 3. Alternatively, a base plate (not shown) with grooves N can be used.

The lower edges 3 1 of the electrodes 3 fit thereby into the grooves N. According to FIGS. 2 and 2b, the upper edges 3.2 are separated from each other by spacers 4 (see FIG. 2a) in the manner of clamps. FIG. 2 shows the side view, and FIG. 2b the front view, of electrodes 3 with spacers 4. The spacers 4 are designed in a U-shape; they grip with both of their parallel arms 4.1 over the upper edge 3.2 of the electrode 3; and they determine the upper spacing of the electrodes by the width b of the parallel arms 4.1. In order to guarantee a parallel arrangement of the electrodes, the width L1 of the arms 4.1 of the spacer 4 must approximately correspond to the spacing L2 of the grooves N. For this, it is sufficient for spacers 4 to be arranged on only every other electrode. In order not to cause a short circuit, spacers 4 are made from an electrically non-conductive material, preferably from plastic. The frame can also be made from a material that does not conduct electricity or be sheathed in such a material, e.g., in plastic. The spacers 4 can be connected to each other by a cable 5 or a chain. The cable 5 is hereby guided, for example, through a bore hole 4.2 of the spacer 4.

FIG. 3 schematically illustrates the flexible positioning of the electrodes 3 in the grooves N, enabling the electrodes to be simply unfolded, in order to perform possible maintenance or cleaning.

Figure 4:
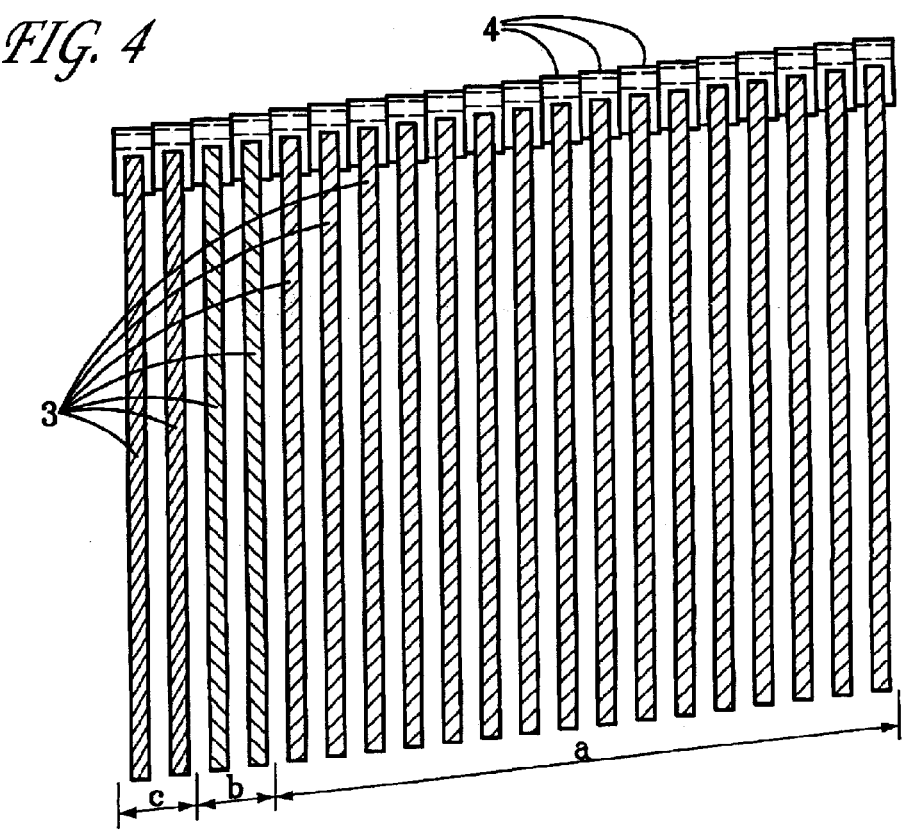
FIG. 4: Combination of electrodes made from different materials.

FIG. 4 shows a possible combination of electrodes made from different materials. For this, a total of twenty (20) electrodes are provided in a frame, wherein 16 electrodes made from aluminum are provided in a first area a; 2 electrodes made from iron are provided in an area b; and 2 electrodes made from graphite are provided in area c. The ratio of the number of electrodes made from aluminium to the number made from iron to electrodes made from graphite amounts hereby to 80:10:10. In this example, a spacer 4 was attached to each electrode 3. The width L1 of the arms that are parallel to each other 4.1 was adapted accordingly. In this embodiment variant, no cable was used.

The grooves were not shown in FIGS. 3 and 4.

Figure 5:
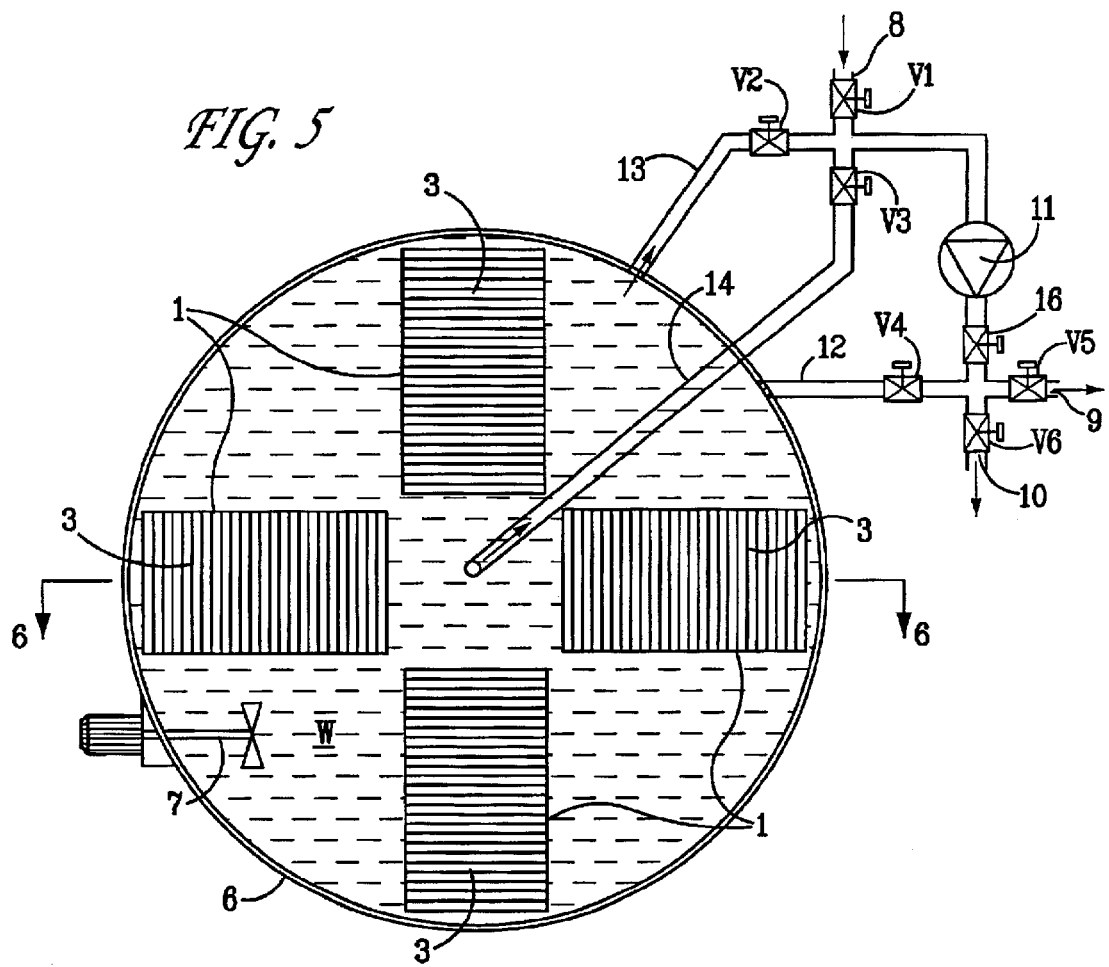
FIG. 5: Top view of a receptacle with four frames.
Figure 6:
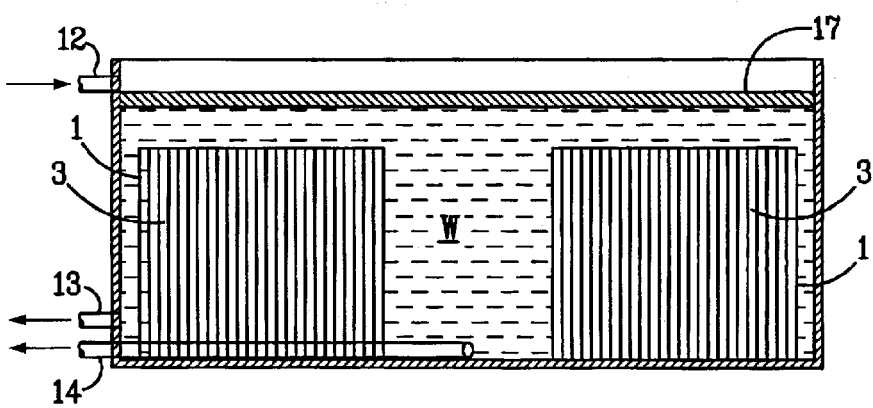
FIG. 6: Section A—A through the receptacle.

FIG. 5 shows the top view, and FIG. 6 shows Section A—A according to FIG. 5, of an arrangement of a total of 4 frames 1 with electrodes 3 in a round receptacle 6. Each of the four frames 1 is offset from the other by ca. 90°. A mixer 7 is provided in the receptacle 6 in order to circulate the water W that is to be purified.

The supply line 8 for the water to be purified and a separate drain 9 of the clarified phase and a drain 10 of the sludge phase are present, wherein the pump 11 is arranged between the supply line 8 and the drains 9, 10. A water feed 12 runs from the pump 11 into the receptacle 6. Furthermore, a suction 13 for pumping off the clarified phase and a suction 14 for pumping off the sludge phase are present, both of which are also connected to the pump 11. A stop valve 16 is also provided behind the pump 11.

The valves are arranged as follows:
- a valve V1 in the supply line 8 in front of the suctions 13 and 14 of the pump,
- a valve V2 between the suction 13 of the clarified phase and the pump 11,
- a valve V3 between the suction 14 of the sludge phase and the pump 11,
- a valve V4 between the pump 11 and the water feed 12 to the receptacle 6,
- a valve V5 in the drain 9 of the clarified phase, and
- a valve V6 in the drain 10 of the sludge phase.

In order to fill the receptacle 6 with the water W to be purified, valves V1 and V4 are opened and valves V2, V3, V5, and V6 are closed. The water W flows thereby into the receptacle through the supply line 8 via the pump 11 and the water feed 12.

Following the purification process, while maintaining the current flow in the electrodes 3 and thereby the formation of a coagulation layer 17, the clarified phase of the water is pumped out of the receptacle until the coagulated layer has reached a certain low point. For this, valves V2 and V5 are opened, and valves V1, V3, V4, and V6 are closed, whereby the water is conducted via the suction 13 and the pump 11 to the drain 9 for the clarified phase.

Now, in order to pump out the sludge phase from the bottom area of the receptacle, valves V3 and V6 are opened, whereby valves V1, V2, V4, and V5 are closed. Via the suction 14 that reaches into the middle, of the bottom of the receptacle 6, the flocculent sludge is fed through the pump 11 to the drain 10 for the flocculent sludge.

FIG. 6 shows the height level for the water feed 12, for the suction 13 of the clarified phase, and for the suction 14 of the sludge phase.

Alternatively, it is also possible in the case of floc that has sunk to the bottom region of the receptacle 6 to first suction off this flocculent sludge with the suction 14 and transport it to the drain 10 and subsequently to transport the clarified phase with the same suction 14 to the drain 9 for the clarified phase. The valve control must be appropriately adjusted for this. Different suctions can also be used for suctioning off the sludge and clarified phases.

Instead of a round receptacle, other receptacle forms, e.g., long basins in the shape of a swimming pool, can also be used.

The connections of the electrodes were not indicated in the aforementioned embodiment examples and drawings Customarily, these are connected alternately on a positive and negative pole.

By means of the circulating movement of the mixer 7, the water W that is to be purified flows through the electrodes 3 with different polarities for a specified period of ime (2 to 120 minutes) at 2 to 24 V and 100 to 10,000 A, wherein the heavy metals and/or the arsenic and/or their compounds are deoxidized by the electrolysis that takes place. The coagulations rise to the surface and are subsequently separated. A pH-value of 5.5 can be particularly advantageous for removing arsenic from water (especially drinking water).

Using electrodes 3 made from graphite in the c region generates $CO^2$, which causes a lowering of the pH-value. Alternatively, it would also be possible to supply the water W with $CO^2$ from the outside.

The coagulations rise to the surface of the water during the purification process and form a kind of coagulation layer 17 there (FIG. 6) In this state, as already previously described, while maintaining the electrolysis, the clarified phase is initially pumped off until a pre-selected water level has been reached; and then the remaining sludge phase found on the bottom of the receptacle is suctioned off. The clarified phase is completely purified by means of a sand filter, and, during the sludge phase, the water is separated from the floc in a chamber filter press.

Screening-belt presses or automatic rapid-run filters can, however, also be used.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

What is claimed is:

1. An apparatus for the decontamination of water by means of electrolysis, comprising:
   a) a receptacle adapted to contain water, and having a bottom shaped so as to define a plurality of electrically-insulated electrode mounting channels;
   b) a plurality of substantially impermeable electrodes, mounted with the electrode mounting channels;
   c) a plurality of electrode spacers, mounted with electrodes and maintaining electrical and physical separation between electrodes.

2. An apparatus for the decontamination of water by means of electrolysis, comprising:
   a) a receptacle adapted to contain water, and having a bottom shaped so as to define a plurality of electrically-insulated electrode mounting channels, wherein the receptacle comprises:
      i) a contaminated water inlet mounted with the receptacle such that contaminated water enters the receptacle at a first height above the receptacle bottom;
      ii) a decontaminated water outlet mounted with the receptacle such that decontaminated water exits the receptacle at a second height, less than the first height, above the receptacle bottom;
      iii) a contaminant outlet mounted with the receptacle such that contaminant exits the receptacle at a third height, less than the second height, above the receptacle bottoms;
   b) a plurality of substantially impermeable electrodes, mounted with the electrode mounting channels;
   c) a plurality of electrode spacers, mounted with electrodes and maintaining electrical and physical separation between electrodes.

3. An apparatus for the decontamination of water by means of electrolysis, comprising:

a) a receptacle adapted to contain water, wherein the receptacle comprises:
  i) a contaminated water inlet mounted with the receptacle such that contaminated water enters the receptacle at a first height above the receptacle bottom;
  ii) a decontaminated water outlet mounted with the receptacle such that decontaminated water exits the receptacle at a second height, less than the first height, above the receptacle bottom;
  iii) a contaminant outlet mounted with the receptacle such that contaminant exits the receptacle at a third height, less than the second height, above the receptacle bottom;
b) a frame, adapted to fit in the receptacle;
c) a plurality of electrodes, mounted with the frame such that the frame and electrodes mounted therewith form a unit which can be placed in and removed from the receptacle;
d) a plurality of electrode spacers, mounted with electrodes and maintaining electrical and physical separation between electrodes.

4. The apparatus of claim 3, wherein the frame has groove-like recesses in the portion of the frame proximal the receptacle bottom when the frame is in the receptacle.

5. The apparatus of claim 3, wherein an electrode mounted adjacent an end of the frame is spaced therefrom by a frame spacer.

6. The apparatus of claim 3, wherein the electrode spacers are attached to the electrodes in a detachable manner.

7. The apparatus of claim 3, wherein the electrode spacers clamp to the electrodes.

8. The apparatus of claim 3, wherein the electrode spacers are burl-shaped.

9. The apparatus of claim 3, wherein the electrodes are shaped to define recesses therein, and where the electrode spacers comprise projections that lock into a recess in an electrode.

10. The apparatus of claim 3, wherein the electrode spacers are flexibly connected to each other.

11. The apparatus of claim 3, further comprising a second frame, a second plurality of electrodes mounted with the frame, and a second plurality of electrode spacers, mounted with second plurality of electrodes and maintaining electrical and physical separation between electrodes in the second plurality of electrodes.

12. The apparatus of claim 3, wherein the electrodes comprise a first group comprising aluminum, a second group comprising Iron, and a third group comprising graphite, and wherein the ratio of the number of electrodes in the first group to the number of electrodes in the second group to the number of electrodes in the third group is within the range 60 96:2 30:2 30.

13. The apparatus of claim 3, wherein the electrodes comprise a first group comprising aluminum, and a second group comprising graphite, and wherein the ratio of the number of electrodes in the first group to the number of electrodes in the second group is within the range 60 98:2 40.

14. An apparatus for the decontamination of water by means of electrolysis, comprising:
a) a receptacle adapted to contain water, and having a bottom shaped so as to define a plurality of electrically-insulated electrode mounting channels, wherein the receptacle comprises:
  i) a contaminated water inlet mounted with the receptacle such that contaminated water enters the receptacle at a first height above the receptacle bottom; and
  ii) a decontaminated water outlet mounted with the receptacle such that decontaminated water exits the receptacle at a second height, less than the first height, above the receptacle bottom;
  iii) a contaminant removal port mounted with the receptacle such that contaminant exits the receptacle at a third height, less than the second height, above the receptacle bottom;
b) a plurality of electrodes, mounted with the electrode mounting channels;
c) a plurality of electrode spacers, mounted with electrodes and maintaining electrical and physical separation between electrodes.

15. The apparatus of claim 14, wherein the electrodes are made of materials chosen from the group consisting of iron, aluminum, and graphite.

16. The apparatus of claim 14, wherein the electrode mounting channels comprise cleats mounted with the receptacle bottom so as to form a channel.

17. The apparatus of claim 14, wherein the electrode spacers are attached to the electrodes in a detachable manner.

18. The apparatus of claim 14, wherein the electrode spacers clamp to the electrodes.

19. The apparatus of claim 14, wherein the electrode spacers are burl-shaped.

20. The apparatus of claim 14, wherein the electrodes are shaped to define recesses therein, and where the electrode spacers comprise projections that lock into a recess in an electrode.

21. The apparatus of claim 14, wherein the electrode spacers are flexibly connected to each other.

22. The apparatus of claim 14, wherein the electrodes comprise a first group comprising aluminum, a second group comprising iron, and a third group comprising graphite, and wherein the ratio of the number of electrodes in the first group to the number of electrodes in the second group to the number of electrodes in the third group is within the range 60 96:2 30:2 30.

* * * * *